UNITED STATES PATENT OFFICE.

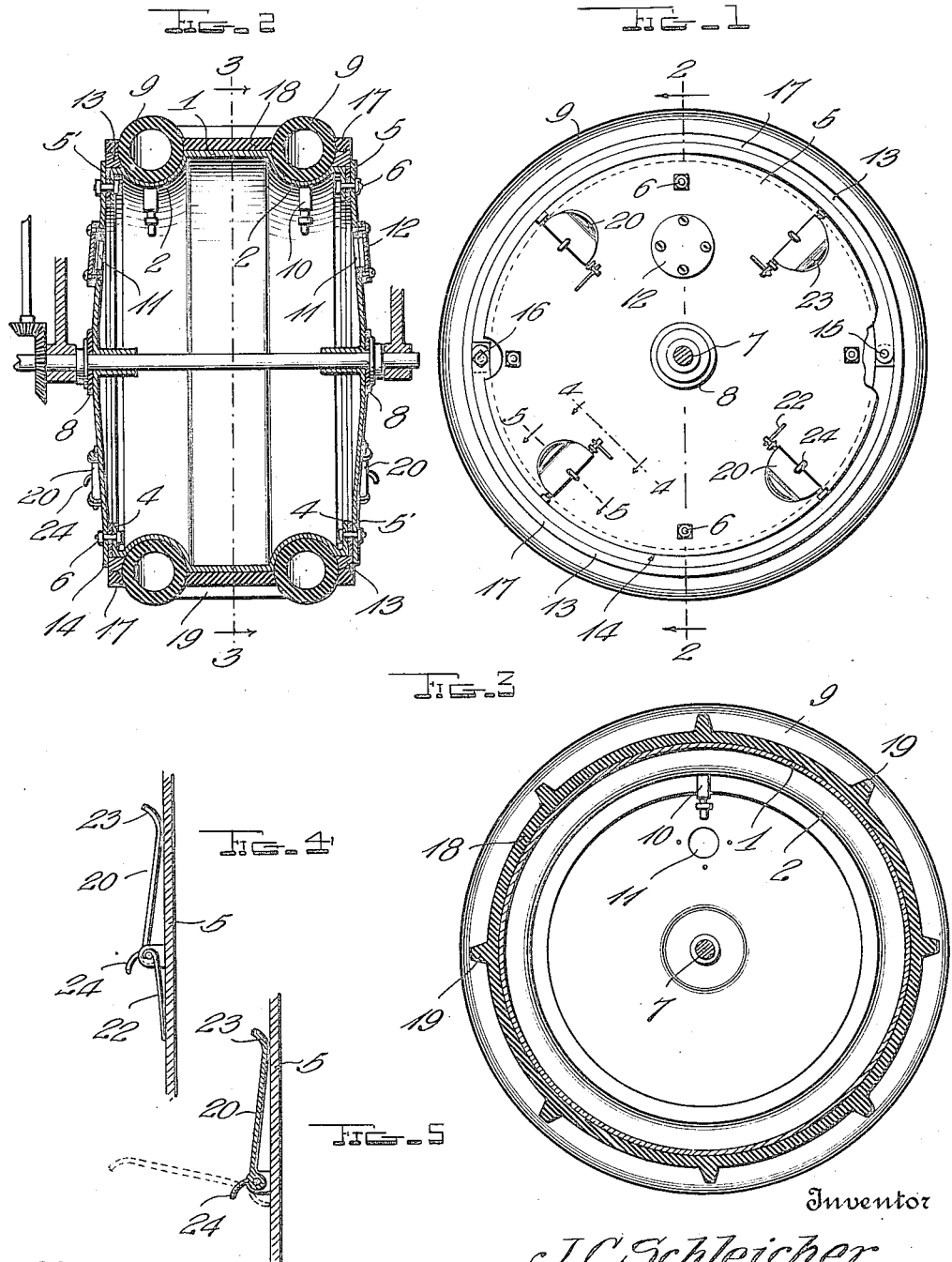

JOHN C. SCHLEICHER, OF MOUNT VERNON, NEW YORK.

VEHICLE-WHEEL.

1,225,181.

Specification of Letters Patent.   Patented May 8, 1917.

Application filed April 29, 1916.   Serial No. 94,461.

*To all whom it may concern:*

Be it known that I, JOHN C. SCHLEICHER, a citizen of the United States, residing at Mount Vernon, in the county of Westchester and State of New York, have invented certain new and useful Improvements in Vehicle-Wheels; and I do declare the following to be a full, clear, and exact description of the invention, such as will enable others skilled in the art to which it appertains to make and use the same.

My invention relates to improvements in vehicle wheels and more particularly to one so designed as to be applicable for use upon land or water, said wheel being capable of application to combined land and water vehicles, combined water and air vehicles, or any other machines adapted to travel at times upon the surface of the water and at other times upon the earth. Although the present invention is designed primarily for use in this manner, it is to be understood that it is applicable for other purposes, the tread of the improved wheel being particularly advantageous for use upon motor trucks or other commercial vehicles.

The object of the invention is to provide a wheel of the type above specified which may be easily and inexpensively manufactured and marketed, yet which regardless of these advantages, will be highly efficient and durable.

With the foregoing general object in view, the invention resides in certain novel features of construction and in unique combinations of parts to be hereinafter fully described and claimed, the descriptive matter being supplemented by the accompanying drawing which constitutes a part of this application and in which:

Figure 1 is a side elevation of the improved wheel;

Fig. 2 is a sectional view thereof taken on the plane indicated by the line 2—2 of Fig. 1;

Fig. 3 is an additional section taken on the plane of the line 3—3 of Fig. 2; and Figs. 4 and 5 are detail sectional views on the planes indicated respectively by the lines 4—4 and 5—5 of Fig. 1.

In specifically describing the structure shown in the drawing above briefly described, similar characters will be placed on corresponding parts throughout the several views and reference will be herein made to the numerous elements by their respective indices. To this end, the numeral 1 designates the rim of the improved wheel, said rim being constructed of suitable gage sheet metal and having its opposite edge portions struck inwardly to provide a pair of circumferential grooves or channels 2, the portion of the rim between these channels being straight in transverse section as shown clearly in Fig. 2. The edges proper of rim 1 are bent inwardly to form annular flanges 4 to which the edges of a pair of side plates 5 are secured by bolts or the like 6, a suitable packing 5' being interposed between said plates and flanges to prevent the entrance of water into the wheel at these points. The side plates 5 are provided with central apertures through which a shaft 7 passes, said shaft being secured to and having any suitable water-tight connection 8 with the plates 5.

Mounted within the grooves or channels 2 are pneumatic tires 9 having valve stems 10 projecting into the interior of the wheel and accessible through hand holes 11 in the side plates 5, said holes being normally closed by cover plates 12 to prevent the entrance of water. The tires 9 are held in position by rings 13 interposed between the outer sides of said tires and the edges 14 of the side plates 5, said edges projecting beyond the periphery of the rim for the purpose of retaining said rings 13 in place.

The rings in question may be of any suitable construction, but they are preferably formed of two sections hinged together at one end as shown at 15 and detachably connected at their other ends by a bolt or the like 16. It will thus be evident that they may be detached at will to permit removal of the tires 9 should this be necessary for repairs or for replacing said tires with new ones. The peripheries of the rings 13 are preferably channeled and provided with tires 17 of solid rubber or the like, the tread surfaces of these tires being spaced inwardly from the treads of tires 9 as shown clearly in Figs. 1 and 2.

A third cushion tire 18 of solid rubber or other preferred material surrounds the portion 3 of the rim 1 and abuts the tires 9, the tread of said tire 18 being disposed on the same radius with that of tires 17, this being essential in order that said tires 17 and 18 may come into use as the sole tread means of the wheel in case the tires 9 should be punctured or should for any other reason be partially or wholly deflated. The tire 18 is preferably provided at its tread with a plurality of transverse rubber ribs 19 formed integrally therewith, said ribs serving to establish a reliable engagement between the tread of the wheel and the earth when the wheel is running on land and also serving to some extent as propellers when the device is traveling over the surface of the water.

The improved wheel constructed substantially as shown and described may be applied upon any vehicle to which it may be found adaptable. It is designed primarily, however, for use on machines of any character which at times travel on land and other times over the surface of the water. When the wheels are running on land, the tires 9 under normal conditions will serve to absorb shocks and jars but even though one or both of these tires should collapse from any cause, the travel of the vehicle will not be impeded since the wheels will then run upon the tires 17 and 18, it being obvious that the projecting tread portions of the collapsed tires 9 will fold into the inner portions of said tires, whereupon injury thereto will be prevented.

When the vehicle equipped with the improved wheels is traveling upon water, said wheels serve as air-tight drums or pontoons to assist in maintaining said vehicle afloat and when these wheels are now driven the ribs 18 serve to some extent as propellers. They are sufficient only, however, to impart slow speed to the craft, but in addition to this propelling means I employ a plurality of normally folded self-projecting paddles 20.

The paddles 20 are hinged at their rear edges to the side plates 5 upon radially extending axes and are normally folded into contact with said plates by springs 22. The front edges of the paddles 20 are curved outwardly as disclosed at 23 to constitute vanes which latter project said paddles to the dotted line position shown in Fig. 5 when they are brought into engagement with the water. The outward movement of the blades 20 may be limited in any preferred manner, but stop fingers 24 are preferably formed integrally therewith as shown clearly in Figs. 1, 4, and 5.

The propelling means just described will be highly efficient and durable regardless of its simplicity and the paddles 20 although being automatically applied to use when in water, will be folded tight against the plates 5 when the wheel is in use on land.

If the improved wheel be applied upon an airship it will be extremely advantageous in case the machine should for any reason land heavily. Under such circumstances probably the two tires 9 will blow out but before so doing they will serve to some extent as shock absorbing means. The tires 11 and 18 further absorb the shock and if the latter is excessive, the side plates 5 will buckle after the usual yielding bearings of shaft 7 have moved to their limits. It will thus be seen that by providing a sufficiently delicate structure to collapse in the manner described, the air craft and its operator may not be injured even though the machine should fall from a comparatively high level.

A wheel whose rim is constructed as described and equipped with the tires 9, 17 and 18 will also be of great advantage on motor trucks and other vehicles since even though one or both of the pneumatic tires should be punctured, the travel of the vehicle need not be suspended since it may then operate upon the solid cushion tires.

In the foregoing I have described certain specific details of construction for accomplishing probably the best results and in the accompanying drawing such details have been illustrated. It is to be understood, however, that within the scope of the invention as claimed numerous changes may be made without sacrificing the main advantages thereof.

I claim:

1. A wheel having a rim provided at its edges with pneumatic tires and having a solid cushion tire between said pneumatic tires with its tread spaced inwardly from the treads thereof, and a pair of detachable rings for securing said pneumatic tires on the rim, said rings having solid cushion tires whose tread surfaces are disposed on substantially the same radius as that of the aforesaid solid cushion tire.

2. A wheel having a rim provided at its edges with circumferential channels and having flanges extending inwardly from said edges, a pair of circular side plates secured to said flanges and projecting beyond the rim, pneumatic tires in said channels, removable rings interposed between said tires and the projecting edges of said side plates to hold said tires in position, said rings having tread surfaces spaced inwardly from the treads of the tires, and a tread surface surrounding the rim between said pneumatic tires, the tread surfaces of said second-named tread and said rings being disposed on substantially the same radius.

3. A wheel having peripheral channels in the edges of its rim, pneumatic tires disposed in said channels, a solid cushion tire surrounding the rim between the projecting portions of said pneumatic tires, said cushion tire having transverse integral ribs on its periphery, a pair of rings engaging the outer sides of said pneumatic tires to retain the same in position, and solid cushion tires surrounding said rings, the tread surfaces of all of the cushion tires being disposed on substantially the same radius.

In testimony whereof I have hereunto set my hand in presence of two subscribing witnesses.

JOHN C. SCHLEICHER.

Witnesses:
J. A. GRIESBAUER,
L. O. HILTON.